May 12, 1970   H. SIMON   3,511,154

LOCK FOR LOCKING THE BACK OF A PHOTOGRAPHIC CAMERA

Filed Sept. 21, 1967

INVENTOR
HORST SIMON

BY
*Harold S. Cauhen*
*Robert W. Hampton*
ATTORNEYS

United States Patent Office 3,511,154
Patented May 12, 1970

3,511,154
LOCK FOR LOCKING THE BACK OF A PHOTOGRAPHIC CAMERA
Horst Simon, Fellbach, near Stuttgart, Germany, assignor to Eastman Kodak Company, Rochester, N.Y., a corporation of New Jersey
Filed Sept. 21, 1967, Ser. No. 669,630
Int. Cl. G03b *19/04*
U.S. Cl. 95—31                                   6 Claims

ABSTRACT OF THE DISCLOSURE

For a roll film camera having means for rewinding the film upon actuation of a rewind slide, a locking mechanism that provides an interlock between the rewind slide and a camera back opening slide to prevent inadvertent actuation of the rewind slide and further to prevent opening of the camera back until the film is rewound. The mechanism includes a pivotal latching lever having cam surfaces and being disposed between the rewind slide and back opening slide so that the rewind slide cannot be moved to rewind the film until the back opening slide is moved to the intermediate position. When the back opening slide is moved to the intermediate position the latching lever is pivoted to permit the movement of the rewind slide to its rewind position. The rewind slide in turn further pivots the latching lever to permit movement of the back opening slide to a back opening position, and movement of the back opening slide to its unlocking position further pivots the latching lever to permit the rewinding slide to return to its normal inoperative position.

---

Reference is made to the following commonly assigned copending application:
U.S. application Ser. No. 654,153, Film Winding And Rewinding Device, filed July 18, 1967 in the names of Kurt Steisslinger and Horst Simon, now U.S. Pat. No. 3,423,041.

BACKGROUND OF THE INVENTION

Field of the invention

The invention relates to photographic cameras and more particularly to such cameras with locking means for a film rewinding mechanism and a camera back.

Description of the prior art

Many roll film cameras are provided with rewinding mechanisms for rewinding the exposed roll of film after use. These mechanisms, whether automatic or manual, generally share the disadvantage that rewinding may be effected by inadvertent actuation of the rewind actuation device, which can cause film wastage or spoilage through double exposures and the like. An example of a known automatic rewinding device is that shown in U.S. Pat. No. 2,591,417, in which automatic rewinding is effected through the action of a spiral rewind spring coupled to the film spool. As the film is unwound from the spool for exposure the spring is tensioned. A spring clutch prevents the rewind spring from relaxing during unwinding of the film. Once unwinding is begun a cam member on the rewinding spring causes a slide member to lock the camera back in a closed position. Rewinding after film exposure is controlled by a button which, when moved to its rewind position, releases the clutch to permit the rewind spring to rewind the film back onto the film spool.

Although opening of the camera back during unwinding of the film through inadvertent movement is prevented by action of the locked slide, no mechanism prevents rewinding of the film during unwinding through inadvertent movement of the control button to the rewind position.

Inadvertent rewinding may occur also in cameras having manual rewinding mechanisms such as that shown in copending application Ser. No. 654,153, filed July 18, 1967, now U.S. Pat. No. 3,423,041. In this copending application movement of a rewinding slide to its operating position causes the winding mechanism to change over for rewinding. A film key is caused to engage a film spool so that the operation of a winding lever which normally causes unwinding of the film, now, through a gearing system which controls rotation of the film key, rewinds the film. Thus, if a user inadvertently moves the rewinding slide to its operating position, further operation of the winding lever will cause unintended rewinding with the attendant probability of film spoilage or wastage.

SUMMARY OF THE INVENTION

The present invention avoids the disadvantages of the prior art devices by providing a simple and compact locking mechanism that may be employed in cameras of any type and protects against unnoticed operation of the rewinding device as well as against unintentional opening of the camera back.

In accordance with a preferred embodiment of the invention, there is provided a lock mechanism wherein movement of a rewind slide for actuating the rewind mechanism is locked into its inoperative position by a latching lever which also controls the movement of a back unlocking slide for unlocking the back of the camera. Movement of the rewinding slide to its operating position is made dependent on the prior movement of the back unlocking member to an intermediate position. In this way both the unlocking slide and the rewinding slide have to be moved before rewinding can take place.

Further, movement of the unlocking slide from its intermediate position to its unlocking position is made dependent on prior movement of the rewinding slide to its unwinding position. Thus to unlock the camera back, three distinct movements are required, viz, movement of the unlocking mechanism to an intermediate position, movement of the rewinding slide to its rewinding position and, finally, movement of the unlocking slide to its unlocking position. Thus inadvertent opening of the back of the camera during unwinding of the film also is prevented, since it is highly unlikely that the movements outlined above would be other than intentional.

In accordance with another aspect of the invention, the rewinding slide, the latching lever, and the unlocking slide are arranged so that movement of the unlocking slide to its unlocking position causes displacement of the latching lever to release the rewinding slide from its operating position for return to its normal position. This permits the rewinding slide to be maintained in its operating position to perform a rewinding operation. When the back lock is unlocked, the operating slide returns automatically into its normal position to render the rewinding device inoperative again, thereby ensuring that the rewinding device is inoperative upon the loading of a new film roll.

In the preferred embodiment of the invention, the arms of the latching lever extend in the direction of movement of the corresponding slides, and control cams are formed as angular surfaces on one side of one part, these angular surfaces co-acting with projections on the associated other part. This embodiment of the invention is characterized by its small space requirements and by the fact that parts of simple geometry may be used.

BRIEF DESCRIPTION OF THE DRAWINGS

The invention as well as objects of and advantages thereof will become more apparent from the course of the following description of the preferred embodiment, reference being made to the accompanying drawing in which.

DESCRIPTION OF THE PREFERRED EMBODIMENT

Figure 1:
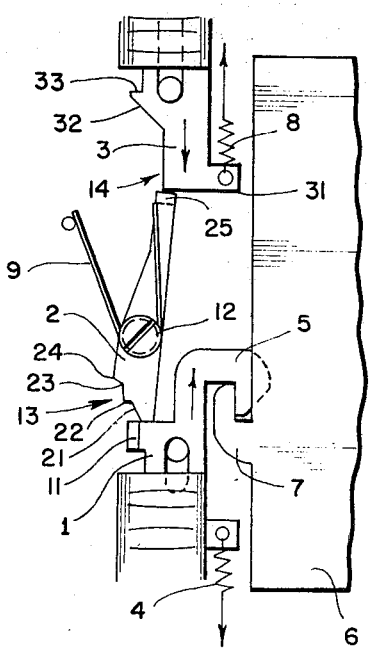
FIG. 1 shows a side view of a camera locking mechanism according to a preferred embodiment of the invention, with the rewinding and the back unlocking slides in their first or inoperative positions.

Referring to FIGS. 1–4, the invention is shown and described only by reference to those parts of a camera necessitating an understanding of the invention, it being further understood that the remaining camera parts are known from the prior art. Thus, the camera body (not shown) may have mounted on one side an unlocking slide or member 1, locking lever 2 and a rewinding slide or member 3. Although members 1 and 3 are referred to as slides, it should be understood that the members may be displaceable other than by translation, for example rotation, to effect the desired results. The rewinding slide 3 may be used as an actuating slide for the rewinding mechanism described in U.S. Pat. No. 2,591,417 where slide 3 could be provided with a cam portion to co-act with the slide member mentioned above to effect rewinding. Alternatively, the rewinding slide 3 may be used with the mechanism disclosed in the above-mentioned copending application Ser. No. 654,153, now U.S. Pat. No. 3,423,041, in which slide 3 comprises the changeover operating slide described in that application, to effect changeover for rewinding. Of course, it should be understood that the rewinding slide 3 also is adaptable to other types of rewinding mechanisms. For example, the slide arrangement could replace the control button means described in U.S. Pat. No. 2,591,417.

Figure 2:
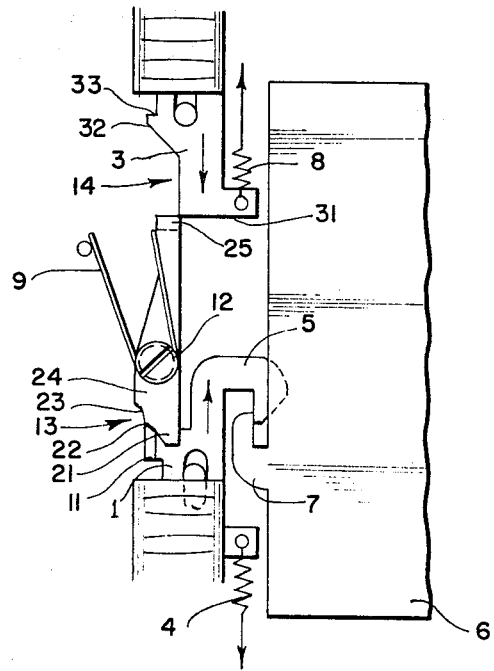
FIG. 2 is similar to FIG. 1 but with the back unlocking slide moved to a second or intermediate position.
Figure 3:
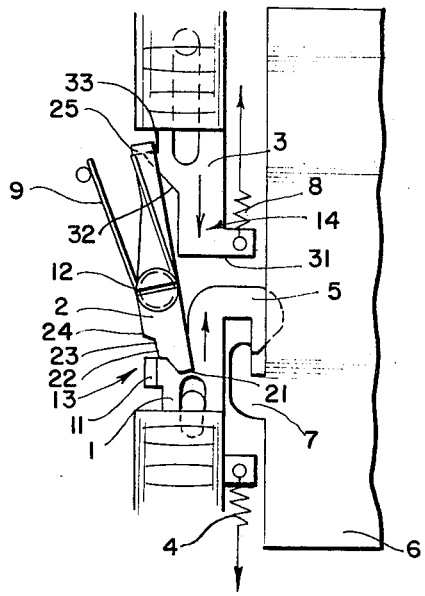
FIG. 3 is similar to FIG. 2 but with the unwinding slide moved to a second or operating position.
Figure 4:
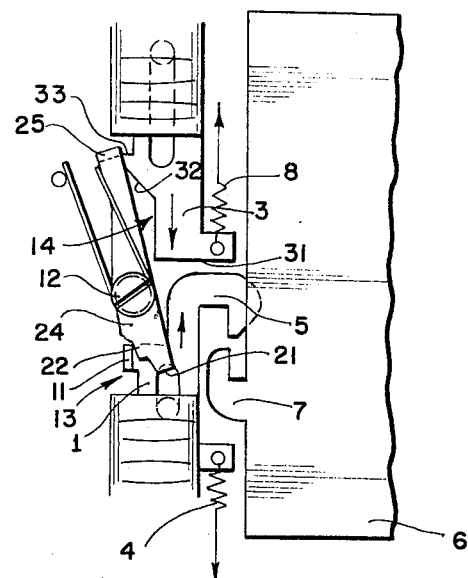
FIG. 4 is similar to FIG. 3 but with the back unlocking slide moved to a third or unlocking position.

The rewinding slide 3 is mounted on the camera body by pin and slot means for movement, against the action of a biasing spring 8, in a downward direction as viewed in the drawing, from its normal position shown in FIGS. 1 and 2 to an end or operating position shown in FIGS. 3 and 4. As stated above, this movement of the rewinding slide 3 actuates a camera rewinding mechanism or converts a camera film driving mechanism to a rewinding mechanism.

The unlocking slide 1, also mounted on the camera body by pin and slot means, is biased downwardly by a biasing spring 4 tending to maintain said slide in its normal position shown in FIG. 1. The unlocking slide 1 is provided with a hook-shaped lug 5 which, when slide 1 is in its normal position, engages a locking nose 7 provided on a camera back 6. Camera back 6 is pivotally or otherwise movably mounted relative to the camera body to permit film loading and unloading after rewind. Generally, to release the back 6, the unlocking slide 1 is moved upward as shown in the drawing, against the action of the spring 4 and into an end position shown in FIG. 4, in which the lug 5 releases the locking nose 7. Both the unlocking slide 1 and the rewinding slide 3 include accessible means such as thumb grips to move the slides in the direction opposite to their respective biased directions.

The locking or latching lever 2, which is of the two-armed type, is arranged between the two slides 1 and 3 and extends approximately in the direction of movement of said two slides. The latching lever 2 is pivotally mounted by suitable means such as screw 12 and is biased by spring 9 in a clockwise direction as shown. Lever 2 has, on its arm facing the unlocking slide 1, a stepped control surface, generally designated by the numeral 13. Control surface 13 includes two cam surfaces 21 and 23 positioned at an angle to the direction of motion of the unlocking slide 1 and separate by a first stop surface 22 positioned perpendicularly to the aforesaid direction of movement of slide 1. A lug 11 on the unlocking slide 1 in the plane of rotation to lever 2 co-acts with the control surface 13 defined by the surfaces 21 to 24.

The latching lever 2 further includes a right-angle lug 25 at its end facing the rewinding slide 3, lug 25 coacting with a control edge or surface of the rewinding slide 3, generally designated by the numeral 14. The edge 14 includes an end surface 31 extending transversely to the path of movement of slide 3, a control surface 32 which extends just parallel to the direction of movement of slide 3 and then at an angle thereto as shown, and a locking nose 33.

The normal positions of the described parts are those shown in FIG. 1. As stated, the unlocking slide 1 and the rewinding slide 3 are biased into their normal positions, by the actions of the spring 4 and spring 8, respectively. The latching lever 2 is maintained in its normal position by biasing spring 9. In its normal position the latching lever 2 with its associated right-angle lug 25 supports the end surface 31 of the rewinding slide 3 so that the slides 3 cannot be moved downwardly. At its other end, the latching lever 2 with its cam surface 21 registers with the lug 11 on the unlocking slide 1. This registration with cam surface 21 holds locking lever 2 in its normal position but does not prevent movement of the unlocking slide 1 upward against the action of the spring 4 from its position shown in FIG. 1 to an intermediate position shown in FIG. 2. The extent of such movement, which movement is made manually by the operator, is determined by the action of the lug 11 of the unlocking slide 1 coming to bear against the transverse stop surface 22 of the locking lever 2. In this intermediate or second position, hook-shaped lug 5 on the unlocking slide 1 still engages the locking nose 7 on the camera back 6 so that the back cannot be opened. Thus, unintentional displacement of the unlocking slide 1 during camera operation will not open the camera back. Further, because rewinding slide 3 is locked by lug 25 in its normal position as shown in FIG. 1, there can be no unintentional movement of this slide.

Movement of rewinding slide 3 to permit film rewind after exposure is dependent on the prior movement of unlocking slide 1. In consequence of the movement of the unlocking slide 1 into the intermediate position shown in FIG. 2, the lug 11 of the unlocking slide 1, by bearing against the cam surface 21 of the control surface 14 of the latching lever 2, causes the lever to rotate, counterclockwise as viewed in the drawing, an amount sufficient to permit lug 25 to clear end surface 31 of the rewinding slide 3. The rewinding slide 3 is therefore unlocked by the movement unlocking slide 1 into its intermediate position, and thus the rewinding slide 3 can be moved by the accessible thumb grip downward against the biasing action of the spring 8 into the rewind mechanism operating position shown in FIGURE 3. As rewinding slide 3 is moved downward lug 25 on the upper end of locking lever 2 comes to bear against the inclined control surface 32 of the operating slide so that the latching lever 2 is rotated counterclockwise a further amount. In its lowermost position the lug 25 on the upper end of the latching lever 2 then engages the locking nose 33 provided on the operating slide 3, locking rewinding slide 3 in its operating position. In this position, in a manner described in copending application Ser. No. 654,153 now U.S. Pat. No. 3,423,041 rewinding slide will have changed over the camera driving mechanism for rewinding so that the exposed film can be rewound onto the film spool.

The further rotation of the latching lever 2 coincident with the movement of the rewinding slide 3 into its operating position causes the stop surface 22 at the lower end of the lever to swing clear of lug 11. As shown in FIG. 3, the second cam surface 23 of the control surface 13 now registers with lug 11 of the unlocking slide 1. As a result the unlocking slide 1 is free to be operated so that, after rewinding of the film, the slide can be moved upward further to engage the second stop surface 24 of the latching lever 2 as shown in FIG. 4. Movement of the unlocking slide 1 to this position disengages lug 5 from the nose 7 on the camera back 6 so that the back 6 now can be opened to unload the rewound film.

Simultaneous with the movement of the unlocking slide 1 to its unlocking position, lug 11 on the unlocking slide 1 interacts with cam surface 23 to cause the latching lever 2 to rotate counterclockwise against the action of the spring 9, until the lug 11 engages stop surface 24 and lug 25 swings free of locking nose 33 on the rewinding slide 3. The rewinding slide 3 thus is restored automatically to its initial position by action of biasing spring 8. This movement of rewinding slide 3 ensures that the driving mechanism of the camera will be automatically restored to its normal position when the camera back is opened so that the camera is ready for a winding operation after a new roll of film has been loaded into the camera.

It is evident from the foregoing that two distinct movements in a particular order are required to move the rewinding slide to its actuating position while three distinct movements in a particular order are necessary to open the back of the camera. Thus unintentional operating of the rewinding mechanism as well as unintentional opening of the camera back are avoided.

Since these and other alternative constructions and modifications may be made without departing from the spirit of the invention, the foregoing detailed description of a preferred embodiment is to be considered as illustrative only and not as limiting the scope of the invention as defined by the appended claims.

I claim:

1. A locking mechanism for a camera including a film rewinding mechanism and a member openable to permit film load and unload, said locking mechanism comprising:
   a rewinding member movable from an inoperative position to an operating position to actuate the camera rewinding mechanism,
   means for locking the openable member in a closed position,
   an unlocking member for disabling said locking means to unlock the openable member, said unlocking member movable from a first locking position to a second intermediate position in which the openable member is locked and to a third unlocking position in which the openable member is unlocked,
   means for latching said rewinding member in its inoperative position, and
   means for releasing said latching means responsive to movement of said unlocking member to the intermediate position to permit movement of said rewinding member to its rewinding position independent of and subsequent to movement of said unlocking member to its intermediate position.

2. The locking mechanism of claim 1 wherein said latching means comprises a pivoted two armed lever which includes at least one control surface co-acting with one of said members, said control surface including at least one cam surface and at least one stop surface.

3. The locking mechanism of claim 1 wherein said latching means includes:
   means for holding said rewinding member in its operating position, and
   means for disabling said holding means upon movement of said unlocking member to its third position, whereby said rewinding means can thereupon return to its inoperative position.

4. The locking mechanism of claim 1 wherein the movable unlocking member and the movable rewinding member are slidable, and further comprising means biasing said rewinding and unlocking members to their inoperative and first positions, respectively.

5. A locking mechanism for a camera including a film rewinding mechanism and an openable back to load film, said locking mechanism comprising:
   a rewinding slide movable along a path from an inoperative position to an operating position to actuate the rewinding mechanism, said slide having a control edge and a locking nose located at one end thereof, and means biasing the slide to its inoperative position,
   a back unlocking slide for locking and unlocking said camera back, the back unlocking slide including a lug portion and movable generally along the same path as said rewinding slide from a normal locking position through an intermediate locking position to an unlocking position, said unlocking slide having a lock member operatively engageable with the back to lock the back, and means biasing the unlocking slide to its normal locking position, and
   a pivoted latching lever disposed between said unlocking slide and said rewinding slide, the lever comprising a first arm having a lug portion which co-acts with said control edge of said rewinding slide and a second arm defining a control surface including first and second cam surfaces and first and second stop surfaces co-acting with the lug portion of said back unlocking slide,
   said latching lever lug portion co-acting with the control edge to lock the rewinding slide in its inoperative position and the first cam surface on said latching lever engaging said back unlocking slide in the normal locking position and permitting movement of said back unlocking slide to the intermediate locking position in which said lug on said back unlocking slide engages with the first stop surface of said locking lever control surface,
   movement of said unlocking slide to the intermediate locking position unlocking said rewinding slide to permit movement of said rewinding slide to the operating position in which the latch lever lug portion engages the locking nose of the rewinding slide to lock the rewinding slide in its operating position and the first stop surface on said latching lever is disengaged from the unlocking slide lug portion to engage the second cam surface for permitting movement of said unlocking slide to the unlocking position, and
   movement of said unlocking slide to the unlocking position causing disengagement of the lock member from the back to unlock the back and permitting said rewinding slide to return to its inoperative position.

6. The locking mechanism of claim 1 further comprising:
   means for normally preventing movement of said unlocking member to its third position when said rewinding member is in its inoperative position, and
   means responsive to movement of said rewinding member to its operative position for disabling said last-mentioned means to thereupon permit movement of said unlocking member to its third position, whereby said openable member cannot be opened unless said rewinding member is in its operative position.

References Cited

UNITED STATES PATENTS 2,591,417  4/1952  Frye _____ 95—31
3,423,041  1/1969  Steisslinger et al. ____ 242—71.6

NORTON ANSHER, Primary Examiner

D. S. STALLARD, Assistant Examiner